United States Patent [19]

Marshall et al.

[11] Patent Number: 5,420,858
[45] Date of Patent: May 30, 1995

[54] METHOD AND APPARATUS FOR COMMUNICATIONS FROM A NON-ATM COMMUNICATION MEDIUM TO AN ATM COMMUNICATION MEDIUM

[75] Inventors: Ken Marshall, Fremont; Robert Newman, Santa Clara; Michael Pham, San Jose, all of Calif.

[73] Assignee: SynOptics Communications, Inc., Santa Clara, Calif.

[21] Appl. No.: 58,157

[22] Filed: May 5, 1993

[51] Int. Cl.⁶ .............................. H04J 3/26
[52] U.S. Cl. ...................... 370/60.1; 370/79; 370/94.1
[58] Field of Search ........ 370/60, 60.1, 61, 58.1–58.3, 370/56, 85.3, 94.1, 85.6, 79, 82

[56] References Cited

U.S. PATENT DOCUMENTS

| | | | |
|---|---|---|---|
| 4,766,591 | 8/1988 | Huang | 370/60 |
| 5,050,166 | 9/1991 | Cantoni et al. | 370/94.1 |
| 5,067,123 | 11/1991 | Hyodo et al. | 370/58.1 |
| 5,101,404 | 3/1992 | Kunimoto et al. | 370/60 |
| 5,140,585 | 8/1992 | Tomikawa | 370/60.1 |
| 5,163,045 | 11/1992 | Caram et al. | 370/60.1 |
| 5,237,569 | 8/1993 | Sekihata et al. | 370/94.1 |

Primary Examiner—Douglas W. Olms
Assistant Examiner—Chau T. Nguyen
Attorney, Agent, or Firm—Blakely, Sokoloff Taylor & Zafman

[57] ABSTRACT

An apparatus and method of communicating between devices coupled to two networks. The first network comprises a terminal, containing an Ethernet interface, communication medium and an Ethernet interface contained in a concentrator. The second network comprises an Asynchronous Transfer Mode (ATM) interface contained in a switch, a communication medium and other components of an ATM network. Terminals transmit packets to other devices by: transmitting a packet to the concentrator, the concentrator segments the packet's information into ATM cells, and transmits the cells over the ATM network. The Terminals receive packets from other devices by: the ATM network transmitting cells to a concentrator, the cells being reassembled into Ethernet packets, then the packets being transmitted to the appropriate terminal.

6 Claims, 14 Drawing Sheets

ATM Cell 201

| Bytes | 5 | | 48 |
|---|---|---|---|
| | Header 202 | VCI - 2 Bytes 204 | Information Field 203 |

Ethernet Packet 301

| Bytes | 7 | 1 | 2 or 6 | 2 or 6 | 2 | 0-1500 | 0-46 | 4 |
|---|---|---|---|---|---|---|---|---|
| | Preamble 302 | 303 | Destination Address 304 | Source Address 305 | 306 | Data 307 | Pad 308 | Checksum 309 |

303: Start of frame delimiter
306: Length of data field

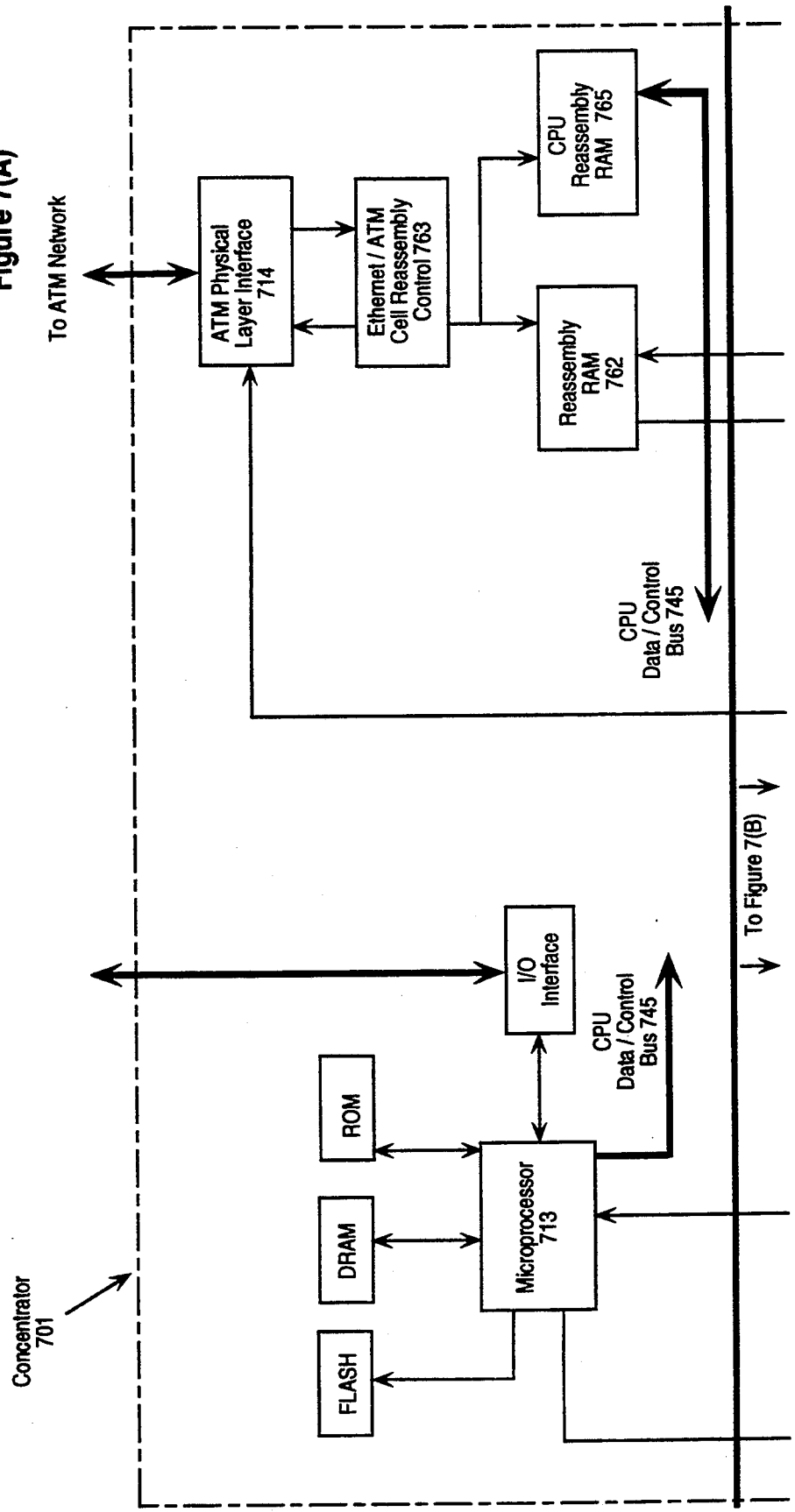

ETHERNET CONCENTRATOR PROTOCOL

METHOD AND APPARATUS FOR COMMUNICATIONS FROM A NON-ATM COMMUNICATION MEDIUM TO AN ATM COMMUNICATION MEDIUM

BACKGROUND OF THE INVENTION

1. Field of the Invention

The present invention relates to the field of computer networking and, in particular, to the field of Asynchronous Transfer Mode (ATM) communications. In its preferred embodiment, the present invention is used to provide high speed interfaces for interconnection between switches and for connection to servers in a network communications system while allowing an existing installed base of wiring and adapter cards to stay in place by combining an ATM switched network with switched Ethernet (or other shared media communication system) as the connectivity to general class desktop computers.

2. Description of the Related Art

Asynchronous Transfer Mode (ATM) technology is a relatively new approach for providing communications services between devices in a computer network or the like. This technology provides the benefits of circuit switching (e.g., for voice and video applications) and the benefits of packet switching (e.g., for computer communications.) ATM technology is characterized by its use of groups or "cells", as they are typically called in the art, of a fixed size and format.

Typically, an ATM network is implemented using a network of interconnected switches. Each switch supports a number of ports and provides dedicated bandwidth on each port. This is in contrast to typical existing shared local area networks (LANs) where the bandwidth is shared by all users on a LAN segment. It is hoped that commercial implementations of ATM networks will provide port interface speeds of 155 Mbps and higher. In LAN environments, such high speed networks may be used for interconnecting high performance computers such as servers, mainframes, and high performance desktop computers.

It is thought that, in time, ATM networks will be used by more general class desktop machines, such as for delivery of multimedia services. However, in the short term, the extra bandwidth and cost of ATM interfaces is probably not justified for general class desktop machines. However, existing shared media LANs are, at least, beginning to become a bottleneck in computing environments. The continual improvement in the compute power of general class desktop computers, as well as the development of new applications such as multimedia, will cause shared media LANs to become increasingly a bottleneck in computer networks in the future.

There are a number of approaches which have been suggested to relieve such bottlenecks:

(1) Segment the shared media LANs - This approach calls for increasing the number of LAN segments in a network with fewer users per segment. The segments are interconnected using bridging or routing. Of course, using this approach, the bandwidth is still shared although it is shared among fewer users;

(2) Segment the shared media LANs (extreme case) - It is, of course, possible to take the segmenting approach to an extreme and provide one segment per device. In this case, each port is effectively bridged. Of course, while this approach effectively gives dedicated bandwidth to the device, it has drawbacks both in terms of cost and network size (network size is limited because all interfaces are the same speed);

(3) Build ATM switches with lower speed ATM interfaces - This is a technically attractive approach; however, it presents a serious deployment problem in that it requires replacement of the substantial installed base of shared media LAN wiring and adapter cards.

Thus, what is desired is to develop a network providing increased bandwidth, and preferably dedicated bandwidth, with minimal cost, maximum support of large network sizes, and minimal displacement of existing installed equipment.

Having stated all of the above, it may now be worthwhile to briefly provide some further background information on (1) ATM networks, (2) Ethernet networks and (3) terminology.

ATM Networks

ATM (Asynchronous Transfer Mode) technology is a new approach to the delivery of communications services. Various references describe such networks: Handel, R. and Huber, M. N., *Integrated Broadband Networks, an Introduction to ATM-Based Network*, published by Addison-Wesley Publishing company, 1991 (hereinafter referred to as Handel et al.) and de Prycher, M., *Asynchronous Transfer Mode: Solution for Broadband ISDN*, published by Ellis Horwood Limited, West Sussex, England 1991 (hereinafter referred to as de Prycher).

As stated above, ATM combines the benefits of circuit switching (for voice and video applications) and packet switching (for computer communications) to interface speeds of 155 Mbps and higher. Presently, primarily high performance computers, such as servers and mainframes, require such interface speeds.

FIG. 1 depicts a simplified example of an ATM network having a single ATM switch and multiple terminals. It is noted that, typically, an ATM network will include multiple interconnected switches. Each of the switches may have connected thereto multiple devices, including terminals and other switches. In the illustrated example, terminals 103a, 103b, 103c and 103d are each coupled with ATM switch 102. Each terminal includes an ATM network interface, such as ATM network interface hardware (104a, 104b, 104c and 104d). In the preferred system, a connection manager 101 ensures that communication paths are allocated according to the ATM network parameters.

As has been stated, ATM networks are generally implemented using interconnected switches; each switch supporting multiple ports. In contrast to shared media LANs, the switches provide dedicated bandwidth on each port.

As stated above, such networks are more fully described both in de Prycher and Handel et al. Therefore, it is not viewed as necessary to provide further background discussion here and the reader is referred to these sources.

Ethernet and Other Shared Media Networks

For medium to low performance computers, lower performance shared media LANs suffice. The reference A. Meijer and P. Peters, *Computer Network Architec-* tures, Computer Science Press, 1982 (hereinafter referred to as Meijer et al.) describes such shared media LANs (specifically, Ethernet, Token Ring, and FDDI). The present invention will be more fully discussed with respect to an implementation utilizing Ethernet; however, aspects of the invention may be equally applicable to other shared media communication systems. It is also specifically mentioned that Ethernet is but one example, albeit a popular one, of a carrier sense, shared communication media, networking system. The use of Ethernet as an example of a network is not intended to exclude other carrier sense, shared communication media, networking systems.

Most present shared media LANs provide substantially lower effective bandwidth than provided by ATM networks. Shared media LANs share the bandwidth on the LAN, each node having effectively only a fraction of the LAN's bandwidth. For example, typical Ethernet networks share a maximum bandwidth of 10 Mbps between all the nodes attached to a segment of the network.

Terminology

To better understand the discussion of Ethernet and other shared media to ATM communications, the following definitions for terminology used herein is provided:

1) Terminals - Refers generally to the devices that terminate a network connection. These can be computers, printers, null devices and virtually any other device that communicates with other devices.

2) Ports - Refers generally to a logical and/or physical access point to the network.

3) Concentrator- Refers generally to communications devices for receiving information on multiple ports and transmitting the information on one or more of the ports. Concentrators are generally well-known in the art. The present invention discloses a specialized concentrator for receiving information on Ethernet ports and transmitting the information onto an output port coupled with an ATM network. The concentrator provides for segmentation of Ethernet packets into ATM cells prior to transmission onto the ATM network. Conversely, the device of the present invention can receive information on ATM ports and output the information on Ethernet ports. The concentrator also provides for reassembly of Ethernet packets from received ATM cells prior to output of the information onto the Ethernet ports. It might also be noted that the present invention provides for allowing communication between the various Ethernet ports.

OBJECTS OF THE INVENTION

Therefore, what is desired is to provide an improved network communication system. It is further desired to provide such an improved network communication system with minimal displacement of existing network components, such as wiring and adapter cards. It is still further desired to provide such an improved network communication system which provides for relatively high speed interfaces for interconnections between switches and for connections to file servers and other shared devices while allowing for use of an existing installed base of wiring and adapter cards (or otherwise allowing for use of relatively lower cost/lower speed networking of other devices).

These and other objects of the present invention will be better understood with reference to the below Detailed Description and the accompanying figures.

SUMMARY OF THE INVENTION

The present invention provides a method and apparatus for improved local and remote network communications using a specialized concentrator coupled to an ATM network.

The present invention improves communication from an Ethernet medium to an ATM medium. The preferred embodiment of the invention includes an Ethernet interface for receiving packets from the Ethernet medium, a segmentation means for segmenting packets into ATM cells and an ATM interface for transmitting the cells to the ATM network. Each packet's destination address is used to lookup a Virtual Channel Identifier (VCI) for the ATM cells. If no corresponding VCI exists in the lookup table, then the processor requests the ATM connection manager to supply a VCI.

The present invention improves communication to an Ethernet medium from an ATM medium. The preferred embodiment of the invention includes an ATM interface for receiving ATM cells. The reassembly means identifies the packet to which a cell corresponds. If the information is for a new packet, the reassembly means reserves space for the new packet in a memory. The reassembly means stores the cell's information in the memory.

BRIEF DESCRIPTION OF THE DRAWINGS

FIGS. 7(A) and 7(B) illustrate the an embodiment of an Ethernet/ATM concentrator as may be utilized in the present invention.

Figure 1:
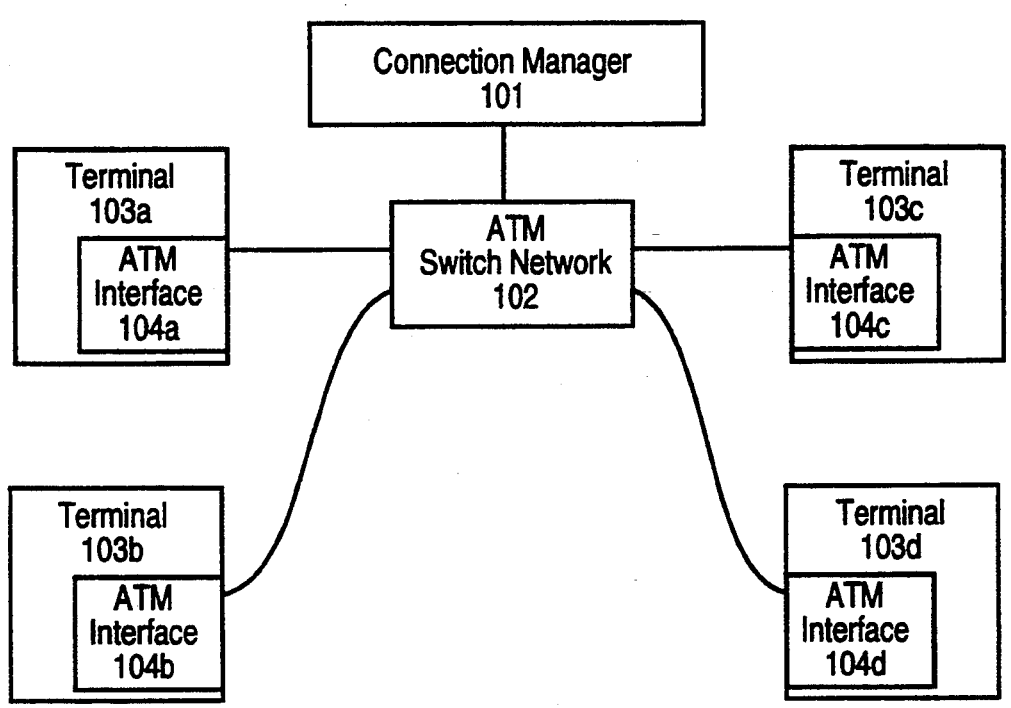
FIG. 1 illustrates an example of a typical ATM network configuration.
Figures 2, 3:
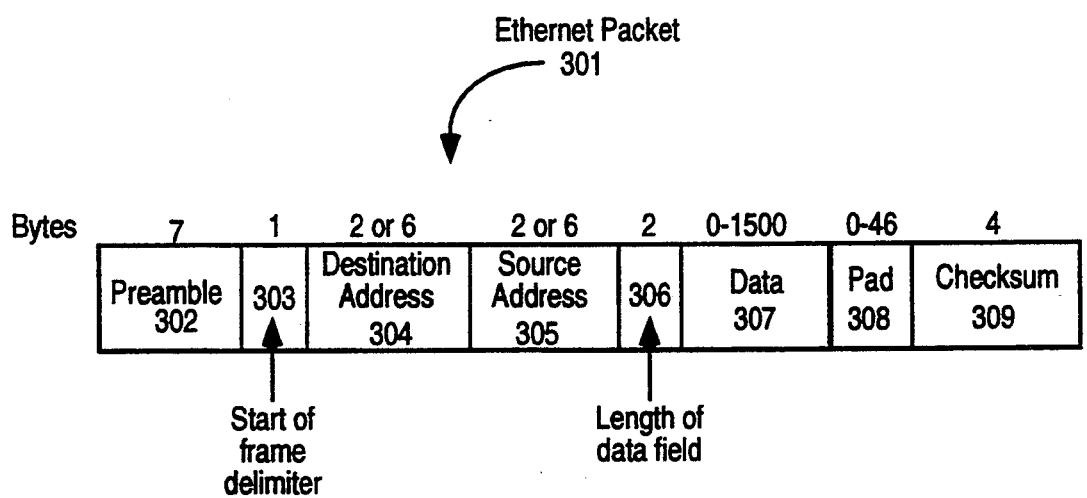
FIG. 2 illustrates the format of an ATM cell.
FIG. 3 illustrates the format of an Ethernet packet.

For ease of reference, it might be pointed out that reference numerals in all of the accompanying drawings typically are in the form "drawing number" followed by two digits, xx; for example, reference numerals on FIG. 1 may be numbered 1xx; on FIG. 3, reference numerals may be numbered 3xx.

DETAILED DESCRIPTION OF THE PREFERRED EMBODIMENT

What is described herein is a method and apparatus for providing improved local and remote communications using a concentrator coupled between an ATM network and another type of network, such as an Ethernet network. In the following description, numerous specific details are set forth in order to provide a thorough understanding of the present invention. It will be obvious, however, to one skilled in the art that the present invention may be practiced without these specific details. In other instances, well-known circuits, structures and techniques have not been shown in detail in order to present the invention more clearly.

OVERVIEW OF THE PREFERRED EMBODIMENT

The present invention allows for providing a network hierarchy wherein relatively high speed interfaces are provided for interconnection between switches in the network and are provided for connection to servers and other shared resources while relatively slower speed connection are provided to other devices. This allows, for example, a networked system which may be running an Ethernet network between all devices in the network to upgrade the bandwidth at certain bottleneck points (e.g., with file servers) while allowing at least a substantial portion of the installed equipment to stay in place (e.g., adapter cards in certain devices on the Ethernet network may remain intact).

The preferred embodiment provides what will be termed a concentrator which supports a number of Ethernet ports and ATM ports. Each Ethernet port is dedicated to a single terminal (i.e., there is a single Ethernet MAC address per port). Thus, a dedicated 10 Mbps of bandwidth is provided to each of these ports. The ATM ports are up-links to an ATM switch. However, it will be obvious to one of ordinary skill in the art that in alternative embodiments multiple Ethernet MAC addresses (and, therefore, multiple terminals) may be supported for a single Ethernet port. This may be accomplished, for example, through use of increased cache size on the concentrator which will allow for storage of additional Ethernet MAC addresses. In addition, it will be obvious to one of ordinary skill that many of the features of the present invention, for example the ability to segment and reassemble Ethernet packets for communication with an ATM network, may be employed in a system having a single Ethernet and a single ATM port.

The concentrator preferably multiplexes information from a number of Ethernet ports into a smaller number of ATM ports. The number of ports (both Ethernet and ATM) may vary from implementation to implementation; however, by way of example, 16 Ethernet ports may be multiplexed into a single one 155 Mbps ATM port. Taking into account overhead of Ethernet and ATM communications, this exemplary configuration may benefit from limited internal queuing within the concentrator to account for rate differences.

The basic function of the concentrator is to segment packets received on Ethernet ports, look-up a path for the packet through the ATM network, and transmit cells comprising information from the Ethernet packets onto the ATM network. The concentrator, in its reassemble mode, also provides for assembly of Ethernet packets from ATM cells and providing the assembled Ethernet packets to the Ethernet ports.

The service provided by the described concentrator appears to terminals coupled with the Ethernet ports as being equivalent to switched Ethernet. Therefore, there is no requirement for change in the terminal hardware or software and, advantageously, an installed base of equipment may be preserved.

From the perspective of the ATM network, the concentrator acts as a multiplexor onto an ATM interface. Consequently, the ATM network routing must cope with more than one destination address per ATM port. This will be described in greater detail below.

The concentrator may, in certain embodiments, perform local switching between the Ethernet ports. However, local switching between the Ethernet ports is not a required function of the concentrator as it is possible to provide embodiments in which all packets (included packets addressed from one locally attached Ethernet port to another locally attached Ethernet port) are segmented and transmitted onto the ATM network-i.e., packets addressed from one locally attached Ethernet port to another locally attached Ethernet port are segmented and transmitted onto the ATM network and switched back to the concentrator for reassembly and transmission to the desired Ethernet port.

OVERVIEW OF DATA FORMATS UTILIZED IN THE PREFERRED EMBODIMENT OF THE PRESENT INVENTION

As has been discussed, the preferred embodiment of the present invention uses both ATM and Ethernet data formats in achieving the described communication between these two networks. It is thought that a brief description of these two data formats will be useful to an understanding of the present invention.

FIG. 2 illustrates the basic format of a cell as may be transmitted in an ATM network. This format corresponds with the CCITF Recommendation I.150, "B-ISDN ATM Functional Characteristics," Geneva, 1991 (the "CCITF Recommendation".) ATM cell 201 comprises a total of 53 octets (also known as bytes); 5 octets for header 202, 48 octets for the information field 203. Header 202 carries information pertaining to ATM network functions, of particular interest is information for identification of the cells by means of the one byte VPI and the two byte VCI 204. See, Handel et al., at pages 14–17. The ATM network uses the VPI/VC1204 to route the cell 201 to its destination. Information field 203 comprises user information.

FIG. 3 illustrates the format of a packet as may be transmitted in an Ethernet network. This format complies with the IEEE 802.3 (1985) standard.

OVERVIEW OF A TYPICAL NETWORK IMPLEMENTING THE PRESENT INVENTION

Figure 4:
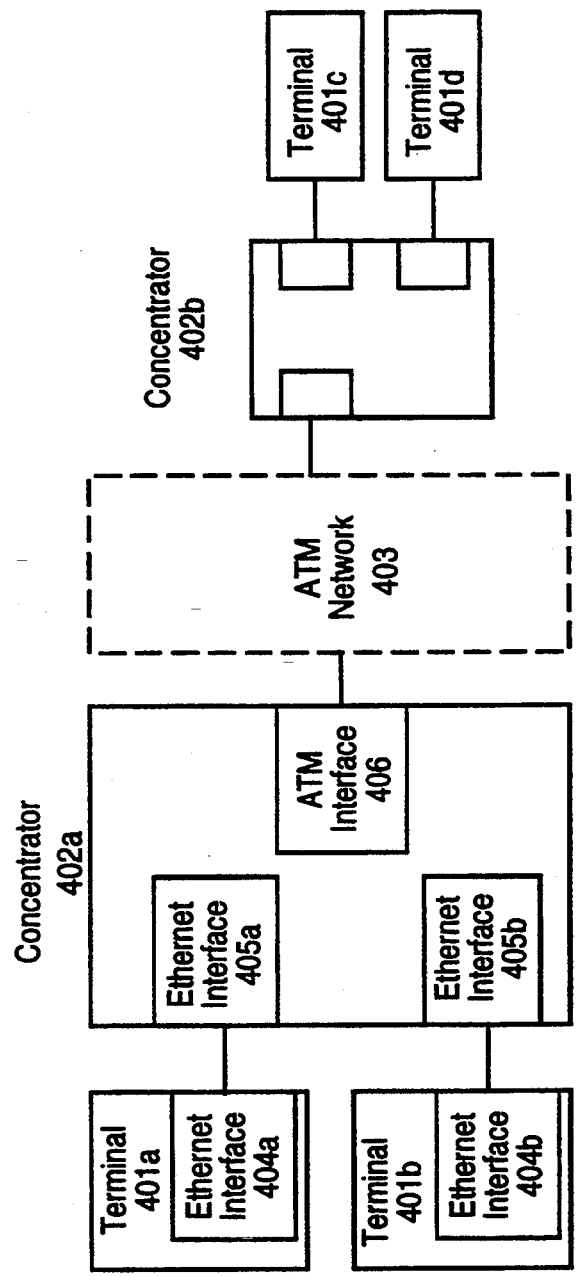
FIG. 4 illustrates a network as may be implemented by the present invention including terminals, a first concentrator, an ATM network, and a second concentrator.

FIG. 4 illustrates a first and second concentrators 402a and 402b coupled with an ATM network 403 as may be implemented in the present invention. Terminal 401a comprises an Ethernet interface 404a. Similarly, terminal 401b comprises Ethernet interface 404b. Concentrator 402a comprises Ethernet interfaces 405a and 405b. Each of interfaces 405a and 405b are dedicated 10 Mbps Ethernet ports. Thus, as illustrated, Ethernet interface 404a of terminal 401a is coupled with Ethernet interface 405a of the concentrator 402a and Ethernet interface 404b of terminal 401b is coupled with Ethernet interface 405b of the concentrator 402a. Concentrator 402a further comprises ATM interface 406 which may be coupled with an ATM network 403. Although the interfaces are not illustrated, concentrator 402b is similarly coupled to the ATM network 403 and to terminals 401c and 401d.

By way of example, to transmit data from terminal 401a to terminal 401c, terminal 401a transmits data to concentrator 402a via Ethernet interface 404a and Ethernet interface 405a. Concentrator 402a segments the information received at Ethernet interface 405a into ATM cells. Concentrator 402a transmits these cells according to ATM communication requirements. The cells are transmitted from ATM interface 406 across ATM network 403 to concentrator 402b. Concentrator 402b assembles the ATM cells into the Ethernet packet. This packet is then transmitted to terminal 401c.

OVERVIEW OF ETHERNET TO ATM TRANSMISSIONS

Figure 5:
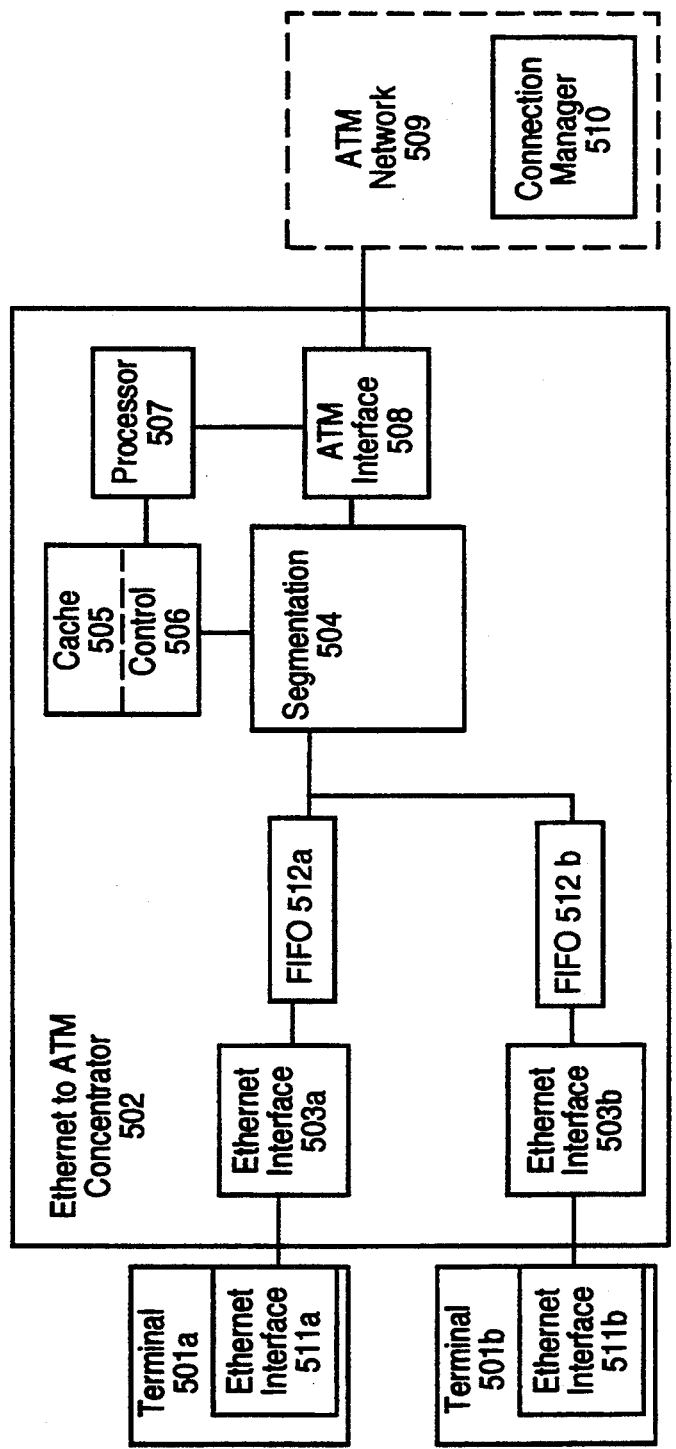
FIG. 5 illustrates a segmentation circuit used in transmitting data from the single host networks to an ATM network.

FIG. 5 illustrates a device that allows a terminal 501a to communicate to an ATM network 509. (Although only two ports are shown, one or more devices may be coupled to concentrator 502 and, as stated above, in one exemplary embodiment the concentrator may comprise 16 Ethernet ports.) Terminal 501a begins transmission of an Ethernet packet from Ethernet interface 511a to concentrator 502's Ethernet interface 503a. (Terminal 501a is the only Ethernet terminal illustrated as being coupled with Ethernet interface 503a; however, in other embodiments additions terminals may also be coupled with this interface.)

Data from Ethernet interface 503a passes to FIFO memory 512a. If Ethernet interface 503b is also receiving dam, FIFO 512b will store data from Ethernet interface 503b and will pass the packet to segmentation circuit 504 after data from from Ethernet interface 503a has passed through segmentation circuit 504.

When the entire Ethernet packet has been received by Ethernet interface 503a, controller 506 performs a lookup for an outgoing Virtual Channel Identifier (VCI). The controller uses the Ethernet packet's destination address (see FIG. 3, destination address 304) to index the cache 505. Cache 505 effectively works as a lookup table with its entries comprising Ethernet destination address/ATM VCI pairs. If cache 505 contains a VCI for the destination address, this VCI is passed to the segmentation means 504.

Should there be no VCI in the cache 505 associated with the packet's destination, a default multicast VCI is passed to segmentation means 504. This default multicast VCI ensures that the packet is sent to all possible destinations so that the correct destination can receive the packet. In addition, the cache control 506 indicates to processor 507 that no VCI entry exists in the cache 505 associated with the packer's destination. Processor 507 will then request setup of a virtual channel between ATM interface 508 and the required destination. The virtual channel identifier will then be received on the ATM network and stored in the look-up table. In the preferred system, this signaling set-up message is sent via ATM interface 508 using a predetermined VCI to a connection manager 510. Connection manager 510 establishes the call and returns the new VCI for the call to the concentrator 502. Control 506 adds the destination address/new VCI entry into cache 505.

Segmentation means 504 segments the packet, either with specific VCI information or multicast VCI information, into ATM cells. Each cell is formatted according to FIG. 2.

Each cell is then transmitted, via the ATM interface 508, to the ATM network 509.

OVERVIEW OF ATM TO ETHERNET TRANSMISSIONS

Figure 6:
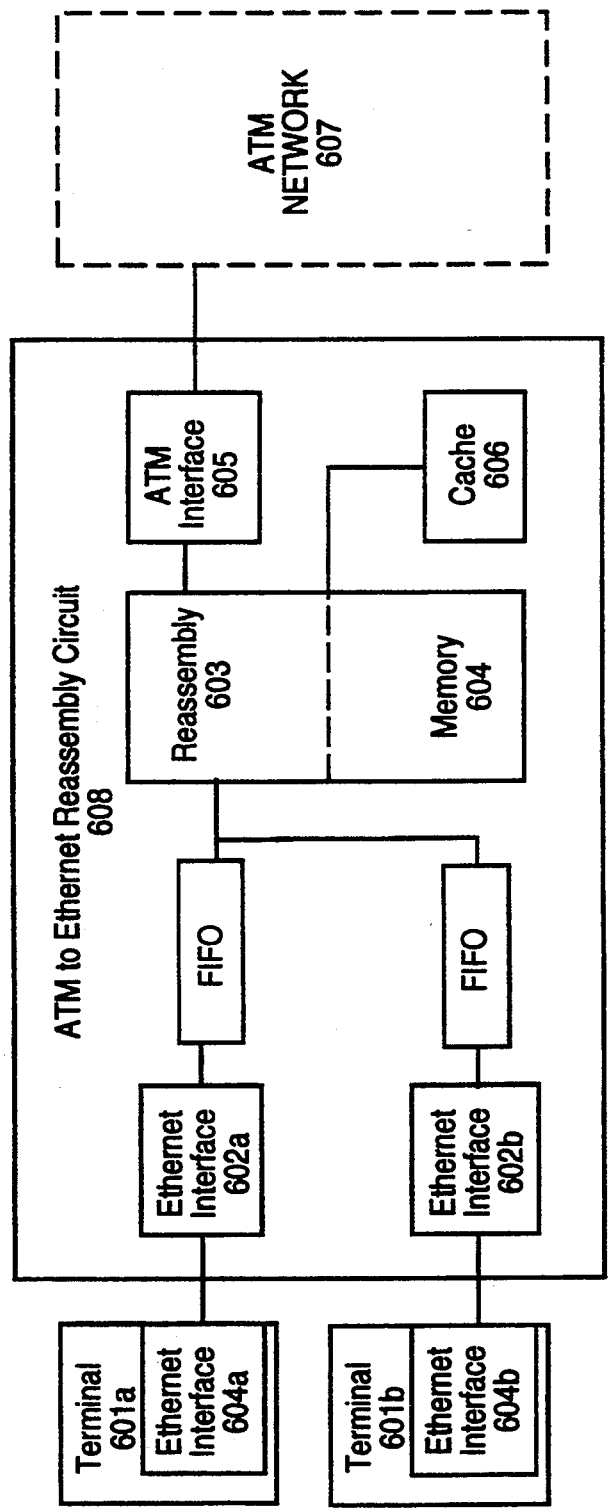
FIG. 6 illustrates a reassembly means used in receiving data from the ATM network and sending the data to the appropriate single host network.

FIG. 6 illustrates an ATM to Ethernet reassembly circuit 608. ATM interface 605 receives an ATM cell from ATM network 607. (FIG. 2 illustrates the cell's format.) Reassembly means 603 uses information in the cell's VCI to lookup the port-id and RAM page address in cache 606 for the packet to be reassembled. Cache 606 works as a lookup table; its entries comprise VCI/destination address pairs. The reassembly means uses the destination address (which is included in the first cell of the packet) to determine the Ethernet interface 602a or 602b on which the packet is to be sent. If this cell is part of a partially reassembled packet, reassembly means 603 stores the data from the cell in memory 604 reserved for the partially reassembled packet. If the cell is at the beginning of a new packet, reassembly means 603 reserves space in memory 604 for a new packet.

Once reassembly means 603 determines that the packet's information is completely reassembled the packet is passed to the appropriate Ethernet interface FIFO 602a or 602b for transmission to the corresponding terminal 601a or 601b.

DETAILED DESCRIPTION OF THE PREFERRED EMBODIMENT

Figure 7B:
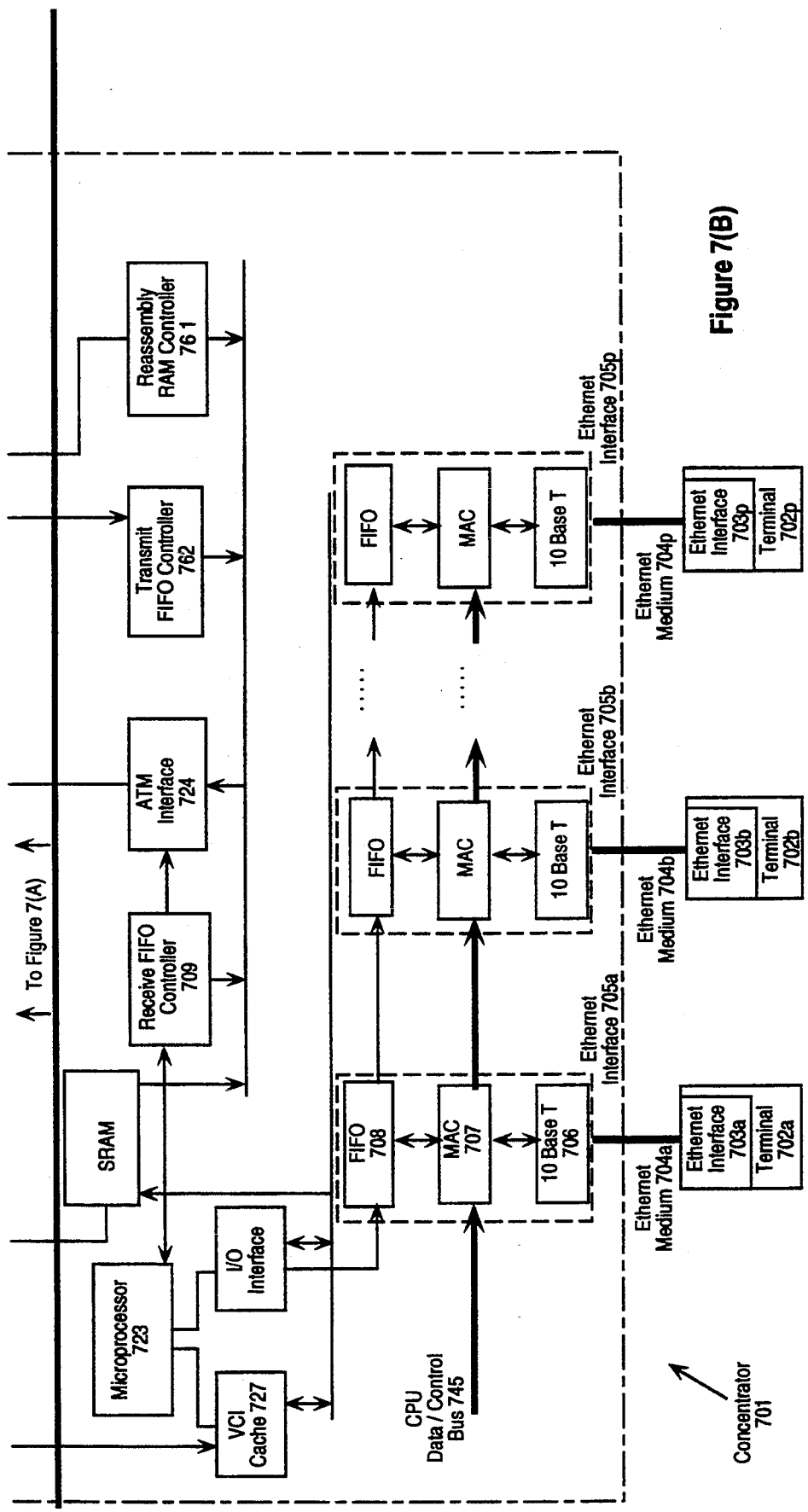
Figure 8:
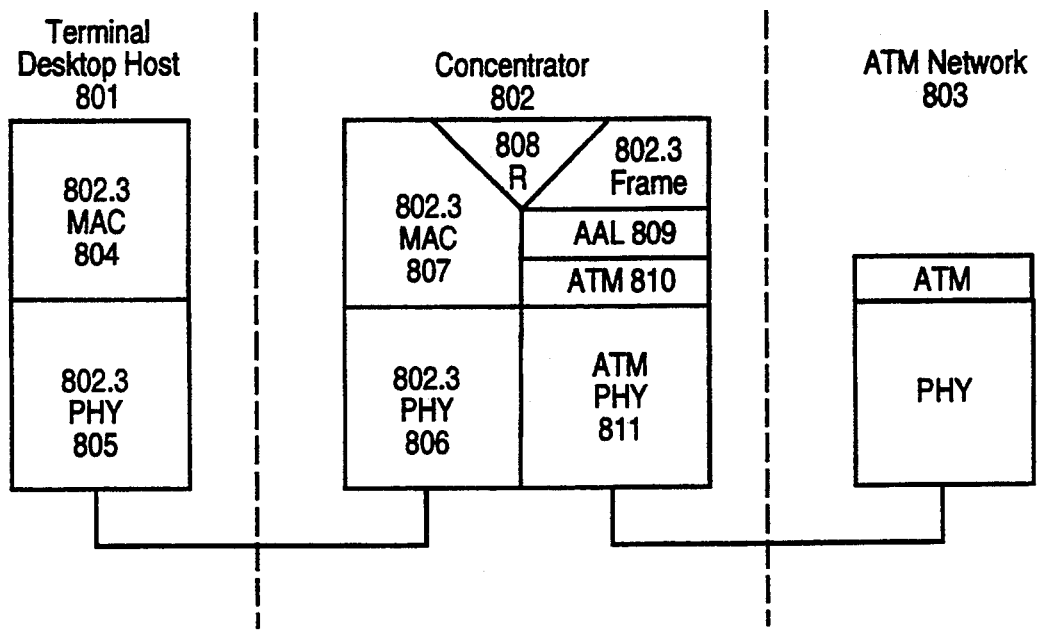
FIG. 8 illustrates the protocol model of a concentrator as may be utilized in the present invention.
Figure 9:
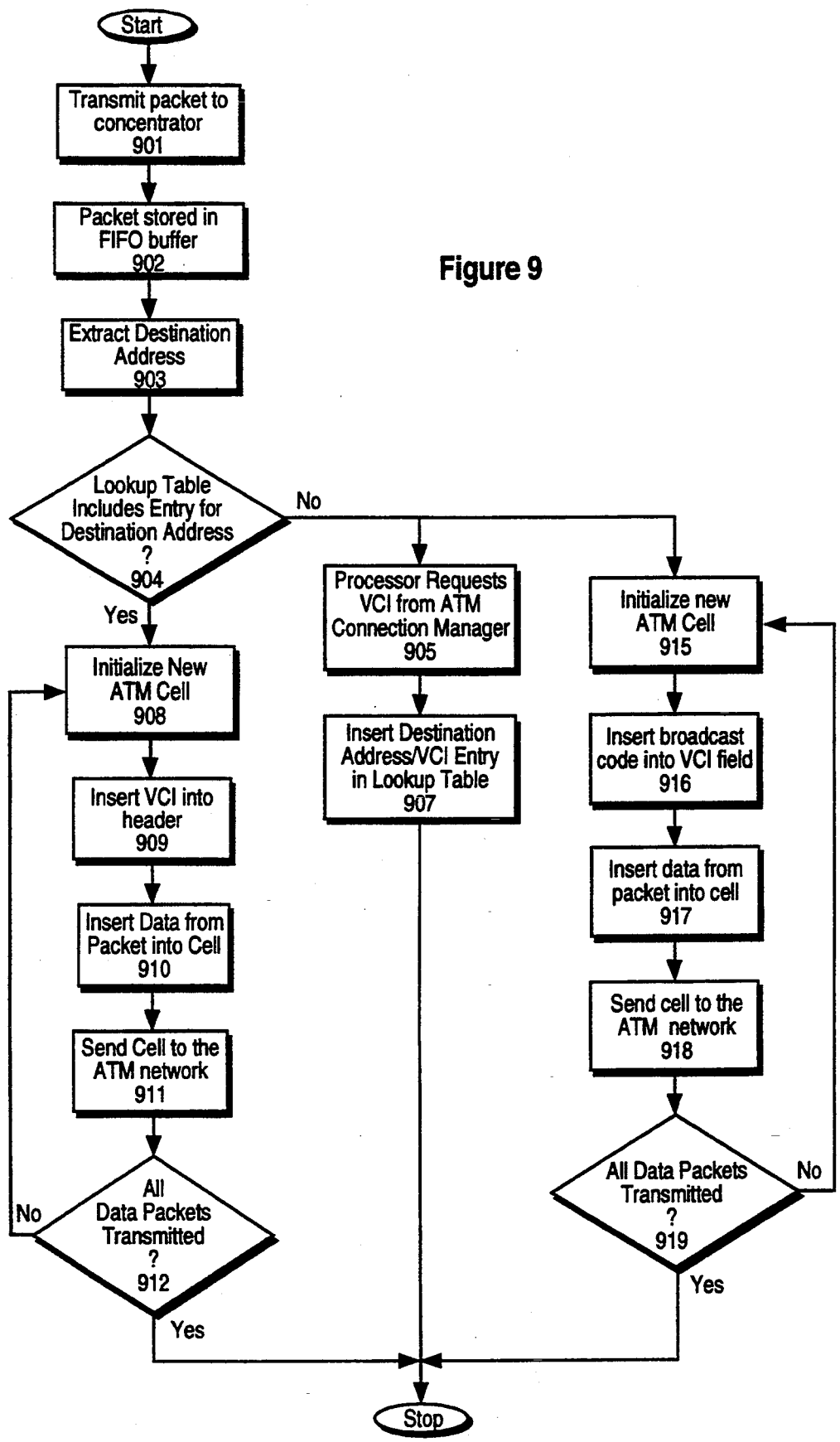
FIG. 9 illustrates a flowchart of an Ethernet packet segmentation method as may be utilized by the present invention.
Figure 10:
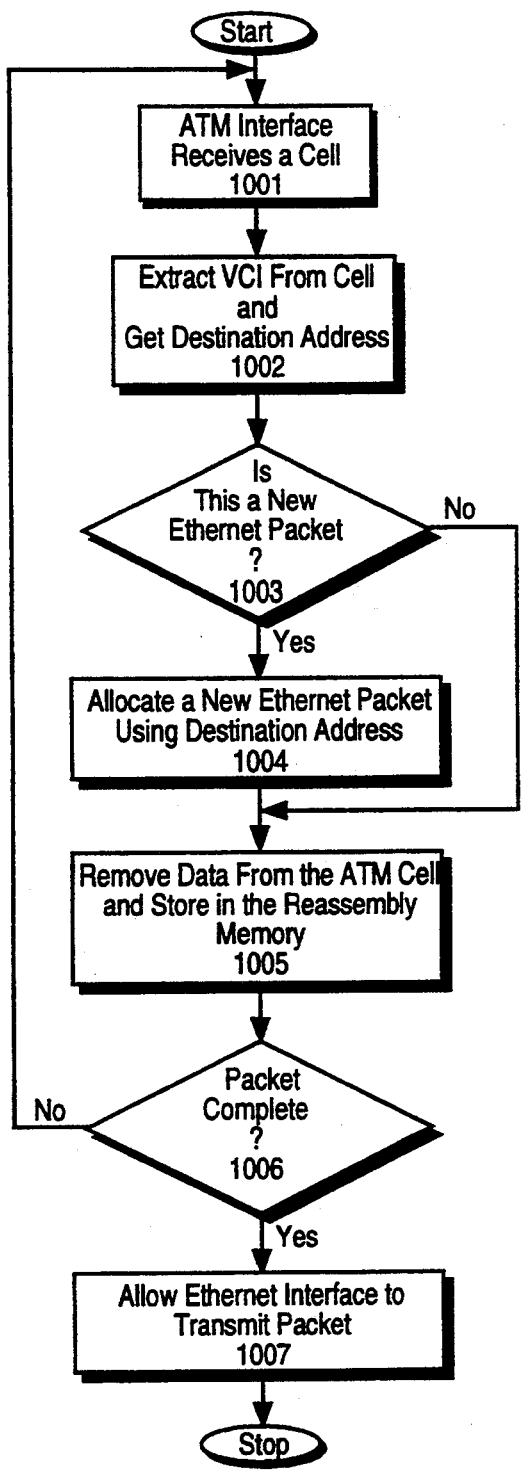
FIG. 10 illustrates a flowchart of an Ethernet packet reassembly method as may be utilized by the present invention.
Figure 11:
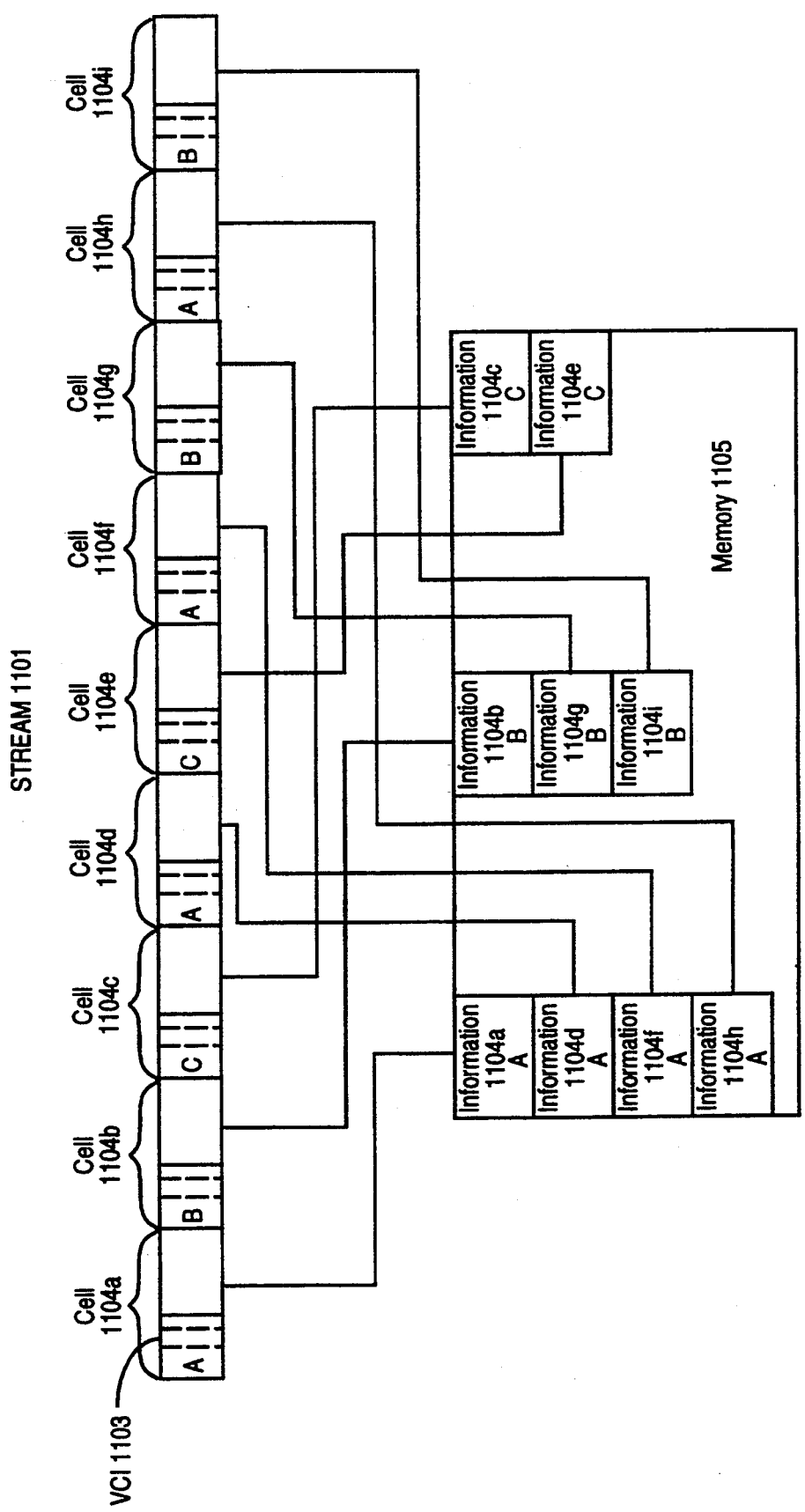
FIG. 11 illustrates a method of reassembling Ethernet packets from ATM cells as may be utilized by the present invention.
Figure 12:
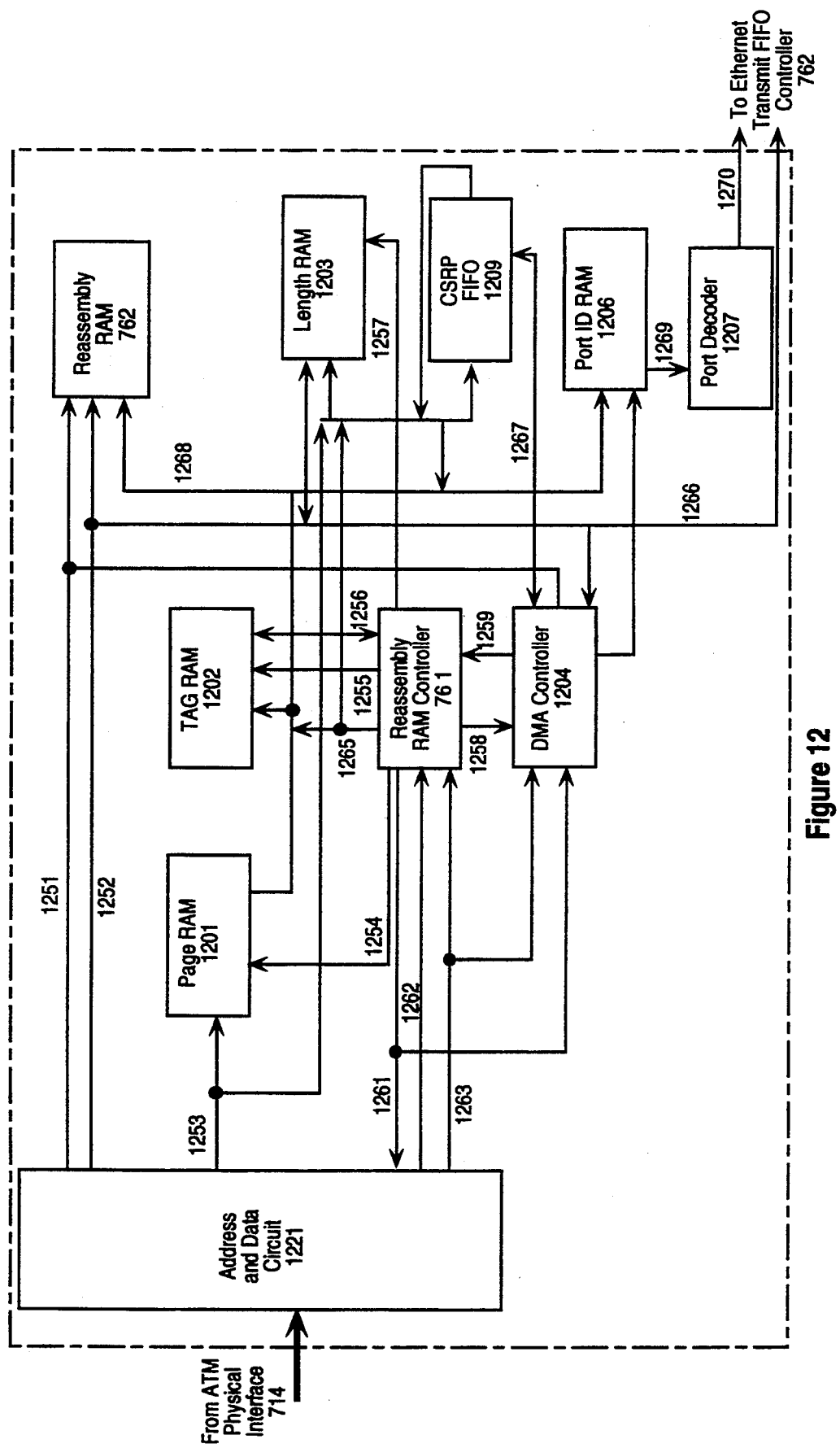
FIG. 12 illustrates Ethernet packet reassembly circuitry as may be utilized by the present invention.

FIG. 7 illustrates the preferred embodiment of the concentrator of the present invention in block diagram form. FIG. 8 illustrates the protocol model of the preferred embodiment. FIGS. 9 and 10 illustrate the methods used in communicating between Ethernet and ATM networks. FIG. 11 illustrates a method of reassembling Ethernet packets from ATM cells. Finally, FIGS. 12 and 13 are provided to illustrate further detail on the concentrator of the present invention with FIG. 12 illustrating further detail on the concentrator in block diagram form and FIG. 13 illustrating further detail on the reassembly circuit, again in block diagram form.

Concentrator 701 allows the transmission of information from terminals 702a-702p to the ATM network and from the ATM network to terminals 702a-702p. Terminals 702a-702p may be, for example, computers such as IBM or compatible personal computers or Apple Macintosh personal computer, but can also be printers or any other device that represents one Ethernet MAC address. Both interfaces 703a-703p and 705a-705p implement the 802.3 MAC layers. Interfaces 703a-703p may be any of a number of commercially available Ethernet interface adapter boards. Similarly, interfaces 705a-705p are implemented using well-known techniques for interfacing with an Ethernet network and may comprise any number of commercially available Ethernet MAC chips. Interfaces 705a-705p may be implemented including an integrated memory-for example, MAC chips with integrated 64 bytes of memory are available.

Ethernet medium 704a-704p is the medium used to communicate between interfaces 703 and 705. This medium may be, for example, coaxial cable but can be any number of communication media such as shielded twisted pair, unshielded twisted pair, radio waves, microwaves, and the like. Advantageously, this medium 704a–704p may, in some installations, be an existing Ethernet communication medium, thus saving expense by not requiring replacement of existing wiring.

Segmenting of Ethernet Packets and transmission onto the ATM network

Initially, an Ethernet packet transmitted by a device coupled with one of the Ethernet interfaces 705a–p and is received on the associated Ethernet interfaces 705a–p, block 901. This discussion will assume receipt of the packet on interface 705a; however, it will be readily understood that receiving a packet on any of the other interfaces 705b–p is accomplished similarly and that the other interfaces are of the same structure.

Ethernet interface 705a comprises a 10 BaseT interface 706 for interfacing with the physical cabling of the Ethernet connection (which interface is commercially available), a MAC (medium access control) chip 707 which provides for functions such as framing of Ethernet packets (MAC chips are also well-known in the art and are commercially available) and, finally, a FIFO buffer 708 which provides for buffering of the Ethernet packet as it is received, block 902. The FIFO buffer 708 is operated under control of FIFO controller 709.

After 12 bytes of the Ethernet packet are received into the FIFO buffer 708, a notification is sent by the FIFO controller 709 to microprocessor 723. Microprocessor 723 is then provided with the destination address 304 from the Ethernet packet and performs a look-up in VCI cache 727 to determine if a VCI has been set up for communication with the specified destination address.

Of course, in alternative embodiments it may be desirable to provide the notification after receiving a greater or fewer number of bytes. In the described embodiment, it has been found that by providing the notification after having received 12 bytes of the packet, the destination address will be available in the FIFO buffer 708 the destination address will have been received and will be available in the FIFO buffer 708.

The microprocessor 723 may be any relatively inexpensive microprocessor such as the Intel 8086 microprocessor which is capable of providing for control of the cache 727. VCI cache 727 may be implemented as a cache memory preferably allowing 1024 to 4096 entries (a larger cache memory leads to increased cost and, therefore, certain embodiments may implement only enough cache memory for 1024 entries while other embodiments, seeking increased performance, may implement a cache memory large enough for 4096 entries). Each entry comprises an ATM VCI field of 16 bits and an Ethernet destination address of 48 bits. General techniques for control of cache memories are well-known in the art.

A look-up is then performed in the cache 727 to determine if the destination address is present in the cache, block 904. If it is present, microprocessor 723 provides the associated VCI information to ATM interface 724 through FIFO controller 709 and ATM interface 724 causes a new ATM cell to be initialized, block 908. The initialization includes formatting of an ATM header 202 (and the VCI information is inserted into the header in field 204, block 909.) The format of ATM headers 202 is well-documented and, therefore, will not be discussed in greater detail here.

FIFO controller 709 then reads data out of FIFO buffer 708. The data is read out of the FIFO buffer 708 and presented to ATM interface 724 and the interface 724 causes the data to be appended into the information field 203, block 910. After formatting of the cell with the header and 48 bytes of data, the cell is transmitted onto the ATM network over ATM physical layer interface 714, block 911. If there are remaining bytes of the Ethernet packet in the FIFO buffer 708, block 912, the transmission is repeated until all bytes of the Ethernet packet have been transmitted on the ATM network in ATM cells.

What has just been described is the case where a VCI had been set up for the specified destination address. In the case where there is no hit in VCI cache 727 for the specified destination address, microprocessor 713 formats a request to be sent to the ATM connection manager 510 to set up a VCI, block 905, over the ATM port. When the connection manager 510 responds, the microprocessor 713 inserts a new VCI/destination address entry into VCI cache 727, block 907.

In addition, ATM interface 724 formats a new ATM cell, block 915 and inserts a broadcast code into the VCI field 204 of the ATM cell, block 916.

The process then continues as described above with data from the Ethernet packet being read from the FIFO buffer 708 and inserted into the cells, block 917, and the cells being transmitted onto the ATM network, block 918. In each case, the broadcast code is inserted into the VCI field 204 of the cell. As described above, this process continues until all data in the packet has been transmitted, block 918. In this way, the information in the packet is broadcast on the ATM network and will, thus, reach its intended destination without need for waiting until a VCI is established for communication with the destination. Of course, in an alternative embodiment it may be desired to wait until the VCI is established before beginning the communication onto the ATM network.

As is illustrated by FIG. 9, establishment of the VCI connection, blocks 905 and 907, may be carried out in parallel with broadcast of ATM cells containing the Ethernet packet, blocks 915 through 919.

It is worthwhile noting that additional packets may arrive from the device coupled with interface 705a (or, even from other devices coupled with other of the interfaces 705b–p) which have the same destination as the destination address of the earlier received packet (i.e., the packet for which a VCI had not yet been established.) However, it is likely that by the time these additional packets are received, the VCI/destination address pair will have been entered into the cache 727 and, therefore, processing of the new packets will continue as described for packets in which the lookup in the cache 727 was successful (i.e., with blocks 908–912.) Of course, if the VCI has not yet been established, these new messages may also be broadcast as discussed in connection with blocks 915 to 918.

Reassembly of Ethernet Packets from ATM cells

Now it is useful to turn to FIG. 10, which illustrates a method for reassembly of packets from cells received from the ATM network and to FIG. 7 and FIG. 12 which are block diagrams illustrating reassembly circuitry utilized in an embodiment of the present invention.

It is thought that it will be useful to first provide an overview of the method for receiving ATM cells and for reassembly of Ethernet packets and then to provide a more detailed explanation. Therefore, discussion will first center on the flow diagram of FIG. 11.

Initially, an ATM packet is received at the ATM interface 714 of the concentrator, block 1001. When an ATM cell is received, the VCI of the incoming ATM cell is used to determine a corresponding Ethernet interface destination address, block 1002. If this is a new Ethernet packet, block 1003, memory space is allocated for the new packet, block 1004. The dam from the ATM cell is then stored in the allocated memory, block 1005. If the ATM cell corresponds to a previously stated packet, again block 1003, the data from the ATM cell is stored in the memory 711 as part of the Ethernet packet already being assembled.

A determination is then made whether all the information has been received for the packet, block 1006. This is accomplished by determining if the received ATM cell is indicates it is the last cell in the packet. If the entire packet has been received, the reassembled packet is transmitted over the appropriate Ethernet interface 705a–705p, block 1007. If the packet is not complete, again block 1006, the packet is not sent over the appropriate Ethernet interface 705a–705p. The concentrator 701 continues to await reception of additional ATM cells in order to allow completion of reassembly of the Ethernet packet.

FIG. 11 illustrates the method of concurrently reassembling Ethernet packets. In particular, reassembly of three Ethernet packets is illustrated.

Stream 1101 represents a stream of ATM cells that a concentrator's ATM interface may receive. The cells are received in the order shown, from left to right; Cell 1104a is received by the ATM interface first, cell 1104i is received last. The cells contain the information from three disassembled Ethernet packets (the Ethernet packets being earlier segmented and transmitted on the ATM network by a concentrator); the three Ethernet packets are referred to herein as packets A, B and C. Cells 1104a, d, f and h contain the disassembled information from Ethernet packet A. Cells 1104b, g and i contain disassembled information from Ethernet packet B and cells 1104c and e contain disassembled information from packet C. Each cell 1104a–1104i represents an ATM cell as formatted in FIG. 2, thus, each cell 1104 comprises a header area having therein VCI information 1103 and a data area. The data area of the first cell of each set of cells for a particular packet comprises the 48 bit Ethernet destination address 304 of the Ethernet packet as well as other information from the Ethernet packet 301 (i.e., the destination address is included in cells 1104a, 1104b, and 1104c, but it is not necessary in the described embodiment of the present invention to include the destination address in the remaining cells.) Of course, it is possible in other embodiments that the destination address would be transmitted in each cell.

Upon receiving cells 1104a–c, reassembly means 603 reserves space in memory 1105 for these new packets as described in connection with FIG. 10 and as will be described in greater detail below. Information from these packets is then stored in memory 1105. Although the information is shown as being stored contiguously, the partially reassembled packets can be stored using other methods as are known in the art. As will be understood from the discussion below, memory 1105 corresponds, in the described embodiment, with the reassembly RAM 762.

After reassembly information from the various ATM cells and detecting the end of an Ethernet packet, Ethernet preamble 302 and start of frame delimiter information 303 is added by the MAC chip of the appropriate Ethernet interface 705a–p (e.g., MAC chip 707) and a complete Ethernet packet has been reassembled for transmission to appropriate one of the various device attached to the interfaces 705a–p.

Detailed Description of the Reassembly Circuitry

FIG. 12 illustrates in greater detail the reassembly circuitry of the described embodiment. It is useful to review this Figure in conjunction with FIG. 7.

The reassembly circuitry comprises a data and address circuit 1221, a page RAM 1201, a tag RAM 1202, a reassembly RAM controller 761, a DMA controller 1204, a reassembly RAM 762, a length RAM 1203, a completion sequence reassembly packets (CSRP) FIFO 1209, a port ID RAM 1206, and a port decoder 1207. The functions and relationships of each of these components will now be described in greater detail:

(1) Data and address circuit 1221 - The data and address circuit 1221 is coupled to receive incoming ATM cells and to "strip" the ATM header information from the ATM cells. The circuit 1221 is coupled to provide data from the ATM cell, after stripping the header information, as a data input to reassembly RAM 762 on line 1252. The circuit 1221 further is coupled to provide the "low" address information to reassembly RAM 762 on line 1251 to allow addressing of the RAM 762 for storage of the incoming data during reassembly of the data into Ethernet packets. The low address information is derived by circuit 1221 by counting data bytes for presentation to reassembly RAM 762 and incrementing the low address information for each byte presented. Further, the circuit 1221 is coupled to provide the VCI information from incoming cell headers to page RAM 1201 on line 1253. As will be discussed in more detail below, page RAM 1201 is addressed with the VCI information and provides as an output "high" address information for addressing the reassembly RAM 762.

(2) Reassembly RAM controller 761 - The reassembly RAM controller 761 provides for overall coordination and control of the reassembly circuitry. The controller 761 is coupled to control the page RAM 1201 on line 1254, length RAM 1203 on line 1257, and tag RAM 1202 on line 1255. In addition, the controller is coupled with DMA controller 1204 to allow DMA controller 1204 to request control (on line 1259) and to provide grants/acknowledgments back to the DMA controller (on line 1258). The controller 761 is also coupled to receive requests from the data and address circuit 1221 on line 1262 and to provide grants/acknowledgments on line 1261. In addition, controller 761 is coupled to receive a fast/last indicator from circuit 1221 on line 1263. The first/last indicator indicates to controller 761 whether an ATM cell is indicated as being either the fast or the last cell in a sequence of cells comprising an Ethernet packet to be assembled. The controller 761 utilizes this information, in the case of a first cell, to cause allocation of space in the reassembly RAM 762 for reassembly and, in the case of the last cell, to cause readout of the data from the reassembly RAM 762 for formatting as an Ethernet packet and transmission onto the appropriate Ethernet interface 705a–p.

(3) DMA controller 1204 - DMA controller 1204 is also coupled to receive grants/acknowledgment information on line 1261 and to receive first/last indicator information on lines 1263. In addition, DMA controller 1204 is coupled to control FIFO 1209 and to data line 1252.

(4) Reassembly RAM 762 - Reassembly RAM 762 stores data from the various cells received from the ATM network. The reassembly RAM 762 is coupled through data and address circuit 1221 to receive data, for reassembly into Ethernet packet, from incoming ATM cells over line 1252. In the described embodiment, the Ethernet frame information is stored (e.g., the destination address (DA), source address (SA), length and INFO fields) are stored in the reassembly RAM 762. In the preferred system, the reassembly RAM 762 is a 1M×8 RAM and may comprise any of various commercially available RAM devices. This memory is logically organized in 4K-byte pages with one page assigned to each active VCI. Each of these 4K-byte pages are divided into 2K-byte blocks. This will be discussed in greater detail below.

(5) Page RAM 1201 - Page RAM 1201 provides for the "high" address bits for addressing reassembly RAM 762. Page RAM 1201 is coupled to be addressed with VCI information provided on line 1253 by circuit 1221. The page RAM 1201 is loaded with high order address information for addressing 2K blocks within reassembly RAM 762 corresponding to each of the VCIs. Thus, when addressed with a particular VCI value, the page RAM 1201 provides a corresponding high order address for addressing the reassembly RAM 762. In addition, this same addressing information is used for addressing tag RAM 1202 and port ID RAM 1206.

(6) Tag RAM 1202 - Tag RAM, responsive to being addressed by the data output of page RAM 1201 provides for additional addressing information for addressing reassembly RAM 762. It useful to set forth the sources of the full 19 bit address used to address reassembly RAM 762. This is done in Table I, below:

TABLE I

| Address bits | Source |
|---|---|
| 1-10 | "low" address bits supplied by circuit 1221 |
| 11 | Tag RAM 1202/ controller 761 |
| 12-19 | "high" address bits supplied by page RAM 1201 |

Thus, as can be appreciated, by 4K-byte pages in reassembly RAM 762 are selected using page address information supplied by page RAM 1201; 2K-byte blocks within these pages are selected using tag information from tag RAM 1202; and individual words within these blocks are selected by the low address information supplied from circuit 1221.

It is worthwhile to briefly further describe the content of tag RAM 1202. Tag RAM 1202 is a 1K×4 RAM. In the described embodiment, only bits 0, 1 and 2 of the tag RAM 1202 are utilized and bit 3 is currently unspecified. Table II is useful for further describing the content of entries in tag RAM 1202:

TABLE II

| BIT 2 | 1 | 0 | Block 0 | Block 1 | Status | Action |
|---|---|---|---|---|---|---|
| 0 | 0 | 0 | Empty | Empty | Both empty | Data to block 0 |
| 0 | 0 | 1 | Empty | Empty | B1 empty, B0 busy | Data to block 0 |
| 0 | 1 | 0 | Empty | Full | B1 empty, B0 full | Data to block 1 |
| 0 | 1 | 1 | Empty | Full | B1 busy, B0 full | Data to block 1 |
| 1 | 0 | 0 | Full | Empty | B1 full, B0 empty | Data to block 0 |
| 1 | 0 | 1 | Full | Empty | B1 full, B0 busy | Data to block 0 |
| 1 | 1 | 0 | Full | Full | B1 full, B0 full | No buffer available |
| 1 | 1 | 1 | — | — | — | Illegal state |

Thus, based on reading and writing data to and from the tag RAM 1202 over line 1256, controller 761 may update and determine the current state of the blocks in RAM 762. Based on reading the current status of the blocks of the selected page, controller 761 provides bit 11 of the reassembly RAM address 762 on line 1265. Bit 11 is set to a 0 (indicating block 0) for those combinations of bits 0-2 in Table II indicating an action of selecting block 0 and to 1 for those combinations indicating an action of selecting block 1. In the event of no buffer being available, controller 761 controls grants of access for writing to RAM 762 by circuit 1221 by signaling on line 1261.

(7) Length RAM 1203 - Length RAM 1203 is provided to allow circuit 1221 to store the length of an Ethernet packet at completion of writing the data for the packet into RAM 762. Length RAM 1203 is a 1K×12 RAM and is addressed by the VCI provided on line 1253 and the block indicator bit (i.e., bit 11 ) provided on line 1265. As has been mentioned, length RAM 1203 is addressed under control of controller 761. When the data for an Ethernet packet is read-out of the reassembly RAM 762, the length information is accessed by DMA controller 1204 to allow control of read-out of the appropriate number of bytes of data. Thus, length RAM is coupled to provide length data to DMA controller 1204 over line 1266.

(8) CSRP FIFO 1209 - As reassembly of packets is completed, entries are made in CSRP FIFO 1209. The entries comprise the VCI / block indicator information which allows for addressing of the length RAM 1203, reassembly RAM 762, and port ID RAM 1206. DMA controller 1204 controls, over line 1267 writing to and read-out from FIFO 1209. Thus, DMA controller 1204 allows writing of information to FIFO 1209 as packet reassembly is completed and reads out "high" address information for completed packets for assembly and transmission over the interfaces 705a-p in a first-in, first-out order.

(9) Port ID RAM 1206 - Port ID RAM 1206 is a 1K by 4 bit RAM containing port (interface) address information for addressing the appropriate interface 705a-p associated with each of the packets being reassembled. Port ID RAM 1206 is addressed with the VCI / block indicator information over line 1268. The data output of port ID RAM 1206 is provided to port decoder 1207 over line 1269. Port decoder 1207 then provides the port identification information to Ethernet transmit FIFO controller 762 during read-out of the reassembled packets. The data for the reassembled packets is provided over data bus 1266 (referred to in FIG. 7 as bus 745) to MAC chips (e.g., MAC chip 707) in the interfaces 705a-p.

Operation of the Reassembly Circuitry

Figure 13A:
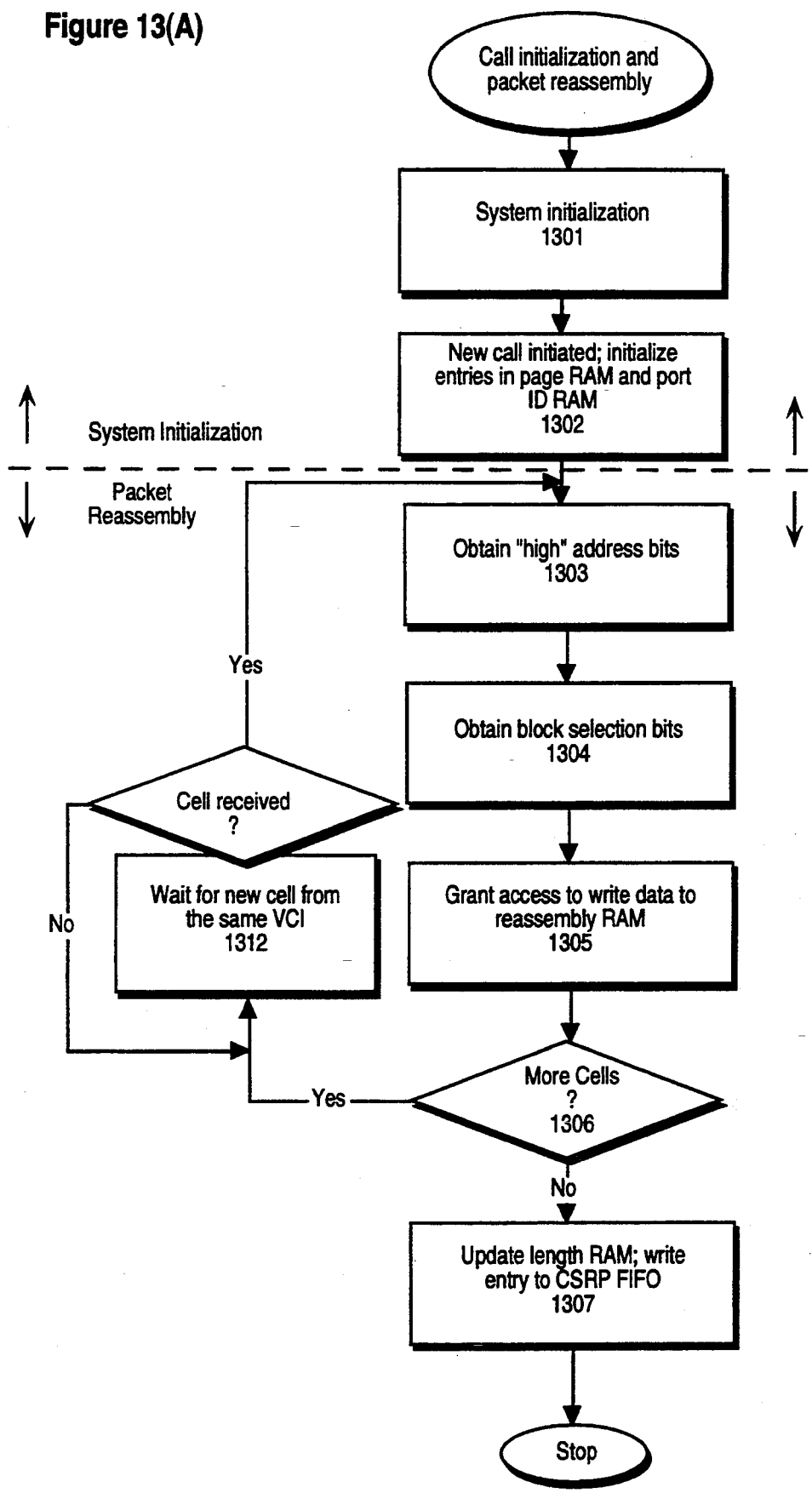
FIGS. 13(*a*) and 13(*b*) illustrate methods of operating the reassembly circuitry of the present invention.
Figure 13B:
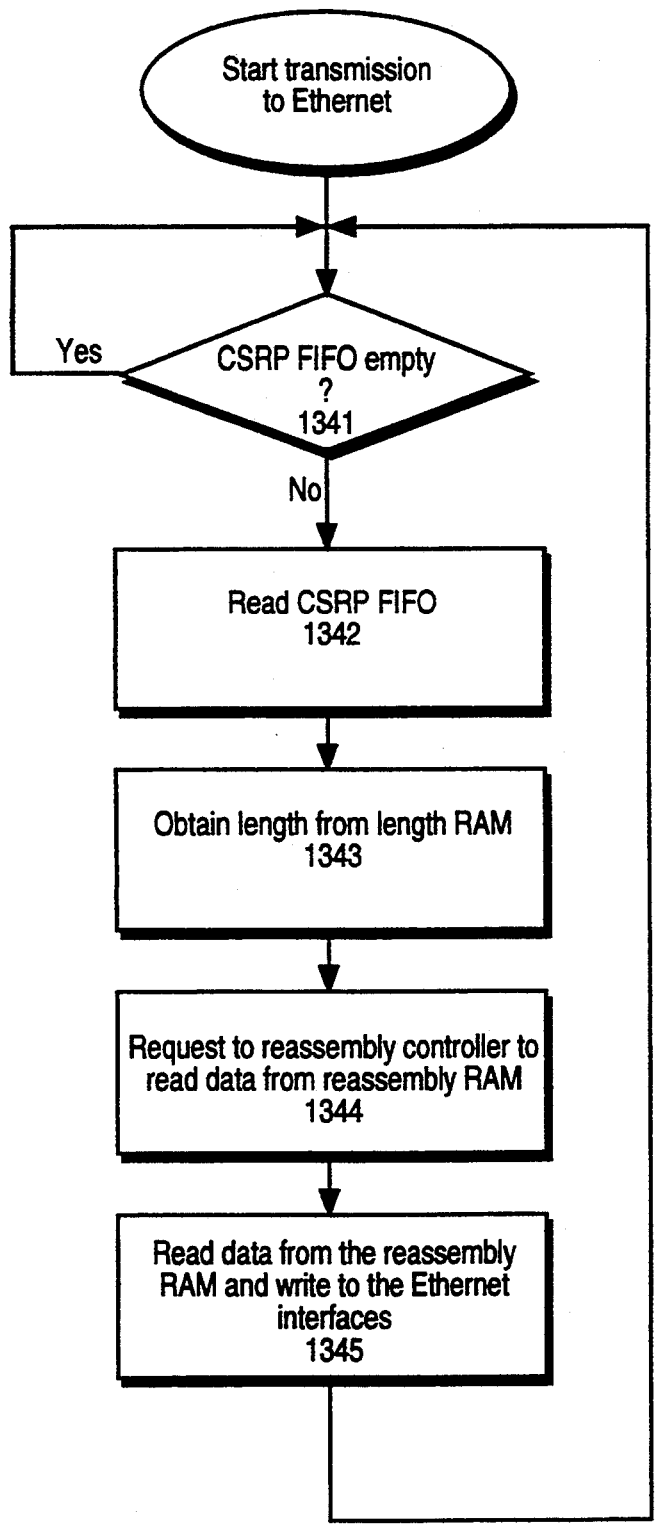

Having now described the reassembly circuitry, it is useful to provide further description of the operation of this circuitry. FIGS. 13(a) and 13(b) are useful for providing a further understanding of the operation of the circuitry with FIG. 13(a) providing an overall flow diagram of the reassembly operation and FIG. 13(b) providing an overall flow diagram of the transfer of a reassembled Ethernet packet to an Ethernet port.

Referring first to FIG. 13(a), the system is initialized by setting bits 0–2 of all entries in the tag RAM 1202 to 000, block 1301.

Then, the reassembly circuit waits for a call to be initiated, block 1302 (call initialization is indicated by receipt of new call information fro connection manager 510). When a call is initialized microprocessor 713 controls writing of a page entry indicating the page in reassembly RAM 762 which will be used to reassemble the Ethernet packet represented by the ATM cell. Processor 713 controls writing an entry to port ID RAM 1206 to indicate the Ethernet interface(s) 705a-p with which the VCI is associated at the time of call setup.

It might be noted that as one feature of the present invention, once a call is setup, multiple Ethernet packets may be reassembled from ATM cells on the VCI identifying the call. Further, as will be understood from further review of the disclosure, call set-up and reassembly of Ethernet packets may occur in parallel when independent VCI's are involved.

The "high" address bits for addressing the reassembly RAM 762 are then obtained by addressing the page RAM 1201 with the VCI, block 1303. These high address bits are then used to address tag RAM 1202 to obtain the block selection bits for the specified page and this information is provided to controller 761, block 1304. Controller 761 then provides the appropriate block addressing bit on line 1265 which together with the "high" address bits, is used to provide a page and block address to reassembly RAM 762.

Controller 761 then grants access to the data bus 1252 to circuit 1221, block 1305. Circuit 1221 has received an ATM cell and parsed the ATM header (to obtain the VCI used above to address the page RAM). Now, circuit 1221 writes the data from the ATM cell to reassembly RAM 762 by presenting the data on data bus 1252 and presenting the "low" address information on line 1251. Low address information is calculated by circuit 1221 by counting bytes of information as they are presented to reassembly RAM 762 and using the count as the "low" address. The count is reset when a block is filled in reassembly RAM 762 (in other words the counter counts is capable of counting from 0 to 2047, in the described implementation utilizing a 2K block size, and then is reset to 0). If the cell indicates it is the last cell in the sequence of cells to be reassembled (on line 1263), block 1306, then the count is written to length RAM 1203 and an entry is written to CSRP FIFO 1209 to indicate the data for Ethernet packet has been fully received and is reassembled. In addition, the tag RAM 1202 is updated to reflect that the block is full and data should now be written to the other block for this VCI.

If the ATM cell is a not indicated as being the last cell in the Ethernet packet sequence, the system waits for receipt of additional cells from the same VCI, block 1312. (It is noted that there may be other ATM cells for other VCI received, and if so, processing continues for those other cells with block 1302.) Once another ATM cell is received, process starts at block 1303 again by obtaining the high address bits for the VCI, obtaining block selection bits, block 1304, granting access to write to the reassembly RAM, block 1305, and determining if the cell is the last cell, block 1306.

If, after filling up block 0 for the page allocated for the VCI (and before transmitting the block to the Ethernet interfaces), additional cells are then received for the same VCI without receiving an indication of the last cell for the packet will be discarded. This occurs under control of controller 761 with controller 761 obtaining the current status (e.g., empty, busy, full) of the blocks for the page in reassembly RAM 762 from the data stored for the VCI in the tag RAM 1202.

In the event there is no overflow, eventually all of the data for an Ethernet packet to be reassembled is received and reassembly is completed as described in connection with block 1307. As was described, upon completion of reassembly of the Ethernet packet, an entry is written to CSRP FIFO 1209. DMA controller 1204 monitors the status of entries in CSRP FIFO 1209, block 1341. If there is an entry in the FIFO 1209, the DMA controller causes the first entry in FIFO 1209 to be read, block 1342, and uses the VCI/block code information stored in the FIFO 1209 to address the reassembly RAM 762, length RAM 1203 and port ID RAM 1206. Thus, the length or number of bytes in the reassembled packet is obtained from length RAM 1203, block 1343. The DMA controller 1204 then causes data to be read out of reassembly RAM 762 for the length specified in length RAM 1203, block 1344, and the data is transmitted to the Ethernet port specified by port ID RAM 1206, block 1345.

ALTERNATIVE EMBODIMENTS

It is noted that many alternative embodiments are within the means of one of ordinary skill in the art and the present invention is intended to be limited only by the claims expressed below.

For example, certain aspects of the present invention are applicable to data transmission systems other than Ethernet, for example other carrier sense systems or non-carrier sense systems such as token ring.

Thus, what has been disclosed is a method and apparatus providing for communicating between a device having an Ethernet interface and a second device operatively coupled to an Asynchronous Transfer Mode (ATM) network.

What is claimed is:

1. A network comprising:
(a) an ATM network for switching ATM cells between ATM switches and devices coupled with said ATM switches;
(b) non-ATM communication media for allowing communication of non-ATM messages on said non-ATM communication media; and (c) a concentrator coupled between said ATM network and said non-ATM communication media for allowing disassembly of non-ATM messages received on said non-ATM communication media and for allowing data from said disassembled non-ATM messages to be transmitted on said ATM network, said concentrator further comprises:
  (i) a segmentation circuit coupled to said non-ATM communication media for segmenting each of said non-ATM messages into at least one ATM cell for transmission on said network; and
  (ii) a reassembly circuit coupled to receive ATM cells from said ATM network and to reassemble non-ATM messages from said received ATM cells, said reassembly circuit having a reassembly RAM for storing data for reassembly into non-ATM messages and control circuitry for controlling addressing of said reassembly RAM based, at least in part, on VCI address information provided in said received ATM cells, wherein said control circuitry comprises:
    (a) a page RAM for providing page addressing information for addressing a page of said reassembly RAM, said page RAM addressed by said VCI address information;
    (b) a tag RAM for providing block addressing information for addressing blocks in said reassembly RAM, said tag RAM addressed by said page addressing information; and
    (c) a counter for addressing individual storage locations within said reassembly RAM, said counter being updated as information is written to said reassembly RAM.

2. The network as recited by claim 1 wherein said control circuitry further comprises a length RAM for storing the length of reassembled non-ATM messages, said length RAM addressed by said page addressing information and said block addressing information.

3. The network as recited by claim 1 wherein said reassembly means further comprises read-out means for reading out reassembled non-ATM messages from said reassembly RAM.

4. The network as recited by claim 3 wherein said read-out means comprises:
  (a) a DMA controller for providing overall control of read-out of said non-ATM messages;
  (b) selection means for selecting a reassembled message for read-out;
  (c) a length RAM storing the length of non-ATM messages; and
  (d) a port ID RAM for providing non-ATM port identification information identifying a non-ATM port for transmission of said non-ATM messages.

5. The network as recited by claim 4 wherein said selection means comprises a first-in, first-out buffer for storing addressing information for addressing said reassembly RAM.

6. The network as recited by claim 5 wherein said addressing information comprises page addressing information and block addressing information.

* * * * *